US010023189B2

United States Patent
Ko (10) Patent No.: US 10,023,189 B2
(45) Date of Patent: Jul. 17, 2018

(54) DEVICE FOR PREVENTING SUDDEN UNINTENDED ACCELERATION

(71) Applicants: Sung-suk Ko, Bucheon-si (KR); BLUECAL CO., LTD, Uiwang-si (KR)

(72) Inventor: Sung-suk Ko, Bucheon-si (KR)

(73) Assignee: BLUECAL CO., LTD., Bucheon-si (KR)

( * ) Notice: Subject to any disclaimer, the term of this patent is extended or adjusted under 35 U.S.C. 154(b) by 31 days.

(21) Appl. No.: 14/965,955

(22) Filed: Dec. 11, 2015

(65) Prior Publication Data

US 2017/0008526 A1 Jan. 12, 2017

(30) Foreign Application Priority Data

Jul. 9, 2015 (KR) .................. 10-2015-0097830

(51) Int. Cl.
*B60W 10/06* (2006.01)
*B60W 30/18* (2012.01)
*B60W 10/11* (2012.01)

(52) U.S. Cl.
CPC ...... *B60W 30/18009* (2013.01); *B60W 10/06* (2013.01); *B60W 10/11* (2013.01); *B60W 2510/06* (2013.01); *B60W 2510/0638* (2013.01); *B60W 2510/18* (2013.01); *B60W 2520/10* (2013.01); *B60W 2540/10* (2013.01); *B60W 2550/12* (2013.01); *B60W 2550/142* (2013.01); *B60W 2710/0605* (2013.01); *B60W 2710/10* (2013.01)

(58) Field of Classification Search
CPC ........... B60W 30/18009; B60W 10/11; B60W 10/06; B60W 2510/0638; B60W 2510/18; B60W 2710/10; B60W 2520/10; B60W 2510/06; B60W 2550/142; B60W 2550/12; B60W 2710/0605; B60W 2540/10

USPC ................................ 701/84, 85, 54
See application file for complete search history.

(56) References Cited

U.S. PATENT DOCUMENTS

| | | | | |
|---|---|---|---|---|
| 5,507,705 A * | 4/1996 | Hara | ............ | B60W 10/06 477/108 |
| 6,076,036 A * | 6/2000 | Price | ............ | B60K 31/047 180/170 |
| 6,553,301 B1 * | 4/2003 | Chhaya | ............ | B60K 6/54 701/54 |

(Continued)

FOREIGN PATENT DOCUMENTS

| | | | | |
|---|---|---|---|---|
| EP | 2210761 A1 * | 7/2010 | ............ | B60K 26/02 |
| GB | 2357160 A * | 6/2001 | ............ | B60K 28/10 |

OTHER PUBLICATIONS

Jörg Kühlwein; Driving Resistances of Lightduty Vehicles in Europe: Present Situation, Trends, and Scenarios for 2025; White Paper; International Council on Clean Transportation Europe; Dec. 2016; Berlin, Germany.

*Primary Examiner* — Roger L Pang
(74) *Attorney, Agent, or Firm* — STIP Law Group, LLC (57) ABSTRACT

Provided is a device for preventing sudden unintended acceleration. The device includes a driving information collector, a vehicle characteristic storage, a controller configured to determine whether the vehicle is in a sudden unintended acceleration state, and a switch configured to block input power of the electronic throttle motor of vehicle on the basis of the determination of sudden unintended acceleration by the controller.

15 Claims, 6 Drawing Sheets

(56) References Cited

U.S. PATENT DOCUMENTS

| | | | |
|---|---|---|---|
| 8,700,256 B2* | 4/2014 | Duraiswamy | B60W 30/143 340/439 |
| 9,517,698 B2* | 12/2016 | Runde | B60W 30/18127 |
| 9,528,853 B2* | 12/2016 | Edgren | G01C 21/3697 |
| 2001/0039230 A1* | 11/2001 | Severinsky | B60H 1/004 477/3 |
| 2002/0055810 A1* | 5/2002 | Nakasako | B60K 6/48 701/22 |
| 2012/0143392 A1* | 6/2012 | Lurie | B64C 13/04 701/1 |
| 2012/0296535 A1* | 11/2012 | Wong | F02D 11/10 701/54 |
| 2015/0025765 A1* | 1/2015 | Oppelland | B60W 50/045 701/70 |
| 2015/0302670 A1* | 10/2015 | Ulrey | G07C 5/0816 701/123 |
| 2017/0008525 A1* | 1/2017 | Ko | B60W 30/188 |

* cited by examiner

DEVICE FOR PREVENTING SUDDEN UNINTENDED ACCELERATION

CROSS-REFERENCE TO RELATED APPLICATION

This application claims the benefit of Korean Patent Application No. 10-2015-0097830, filed on Jul. 9, 2015, in the Korean Intellectual Property Office, the disclosure of which is incorporated herein in its entirety by reference.

BACKGROUND

1. Field

One or more example aspects relate to a device for preventing sudden unintended acceleration, and more particularly, to a device for preventing sudden unintended acceleration of automobiles using an engine controller and a separate controller for preventing sudden unintended acceleration.

2. Description of Related Art

Generally, sudden unintended acceleration denotes that a vehicle unexpectedly moves forward or backward while a driver does not manipulate an accelerator pedal or presses a brake pedal.

Reviewing incident reports up to now, sudden unintended acceleration occurs only in vehicles with automatic transmissions both globally and domestically. When engine power was controlled by a throttle valve connected through cables, there was almost no sudden unintended acceleration incident. However, as electronic throttle strategies were introduced and various kinds of electronic devices were increasingly used in vehicles, the number of sudden unintended acceleration incidents began to increase.

There are two conventional techniques for preventing sudden unintended acceleration, which are employed by automotive manufacturing companies. This first is a technique for limiting engine torque using internal logic of an engine controller when an accelerator pedal and a brake pedal are pressed simultaneously for a certain time. The second is a monitoring logic technique in which when the required torque of an engine is calculated by the amount of press of an accelerator pedal through the control of an internal error, an engine controller calculates required torque through a separate redundant route, compares the required torque calculated through the redundant route with the required torque calculated through the normal route, and limits engine power when a result of the comparison is outside a tolerance range. However, the number of sudden unintended acceleration incidents has not decreased although the sudden-unintended-acceleration prevention techniques are applied to block obvious mistakes of drivers and calculation errors of the engine controller.

In the United States, a new law was legislated, and according to the law, vehicles are forced to be equipped with a Brake Override System (BOS), which is a technique in which when a brake pedal and an accelerator pedal are pressed at the same time, the brake pedal is given priority. Also, in South Korea, the current trend is to apply the BOS to new vehicles.

As such, despite many attempts made to prevent incidents caused by sudden unintended acceleration of vehicles, an optimal solution has not yet been found. Furthermore, currently developed devices for preventing sudden unintended acceleration are not verified completely and are manufactured with expensive components and a complicated structure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One or more example aspect includes a device for preventing sudden unintended acceleration of a vehicle using an engine controller and a separate controller for preventing sudden unintended acceleration.

Additional aspects will be set forth in part in the description which follows and, in part, will be apparent from the description, or may be learned by practice of the presented example aspects.

According to one example aspect, a device for preventing sudden unintended acceleration, the device including a driving information collector configured to collect information, including a vehicle brake signal, a vehicle speed, an engine revolution per minute (rpm), a turbine rpm and an accelerator pedal position, regarding at least one of an instant fuel consumption amount, an intake air flow rate, a coolant temperature, an engine oil temperature, a transmission oil temperature, a road slope, or an atmospheric pressure, a vehicle characteristic storage configured to store data, including a vehicle's weight and a characteristic curve of a torque converter and regarding at least one of a torque ratio curve of the torque converter, a vehicle driving resistance, a gear ratio, a tire dynamic radius, a frictional force for each gear stage from among a plurality of gear stages, an engine moving system inertia, or a powertrain moving system inertia, a controller configured to estimate a fuel consumption amount for each vehicle component from among a plurality of vehicle components based on the information and the data and determine whether a vehicle is in a sudden unintended acceleration state based on at least one of the estimated fuel consumption amount for each vehicle component, including fuel consumption amounts for a transmission slip work loss and an accelerating resistance work loss, the information, or the data, and a switch configured to block an input power of an electronic throttle motor of the vehicle based on the determination of the sudden unintended acceleration state by the controller.

The driving information collector may collect the information through wired or wireless communication with the vehicle.

The vehicle brake signal may be provided from an engine controller or brake sensor of the vehicle to the driving information collector, and information regarding the accelerator pedal position may be provided from the engine controller or an accelerator pedal position sensor of the vehicle to the driving information collector.

The switch may block input power of the electronic throttle motor, or limit engine power through control of the engine controller of the vehicle, or forcibly change mode D or R into mode P or N through control of the transmission controller of the vehicle or warn of the sudden unintended acceleration state and inform of measure thereof audibly or through a display.

When the controller determines the sudden unintended acceleration, the switch may increase or decrease a voltage of an electromagnet of the switch and drive the electromagnet to block the input power of the electronic throttle motor.

The device may further include an emergency button configured to block the input power of the electronic throttle motor upon an emergency.

The emergency button may limit engine power through control of the engine controller of the vehicle or forcibly change mode D or R into mode P or N through control of the transmission controller of the vehicle.

Other features and aspects will be apparent from the following detailed description, the drawings, and the claims.

BRIEF DESCRIPTION OF THE DRAWINGS

These and/or other aspects will become apparent and more readily appreciated from the following description of the example aspects, taken in conjunction with the accompanying drawings in which.

DETAILED DESCRIPTION

The following detailed description is provided to assist the reader in gaining a comprehensive understanding of the methods, apparatuses, and/or systems described herein. However, after an understanding of the present disclosure, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that may be well known to one of ordinary skill in the art may be omitted for increased clarity and conciseness.

Aspects of the present invention will be described in detail to be easily embodied by those of ordinary skill in the art with reference to the accompanying drawings. The example aspects may, however, be embodied in many different forms and should not be construed as being limited to the aspects set forth herein. In the accompanying drawings, portions irrelevant to a description of the examples aspects will be omitted for clarity. Moreover, like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

First, terms used herein will be briefly described, and then the example aspects will be described in detail.

The terms used herein have been selected as general terms which are widely used at present, in consideration of the functions of the example aspects, but may be altered according to the intent of an operator skilled in the art, conventional practice, or introduction of new technology. Also, there are terms which are arbitrarily selected by the applicant in a specific case, in which case meanings of the terms will be described in detail in corresponding description portions of the example aspects. Therefore, the terms should be defined on the basis of the entire content of this specification instead of a simple name of each of the terms.

Throughout the specification, when a portion "includes" an element, another element may be further included, rather than excluding the existence of the other element, unless otherwise described. Moreover, the terms such as "unit" and "module" described in the specification denote an element for performing at least one function or operation, and may be implemented in hardware, software, or any combination of hardware and software. In this disclosure below, when one part (or element, device, etc.) is referred to as being "connected" to another part (or element, device, etc.), it should be understood that the former can be "directly connected" to the latter, or "indirectly connected" to the latter via an intervening part (or element, device, etc.).

Hereinafter, aspects of the present invention will be described in detail with reference to the accompanying drawings.

Figure 1:
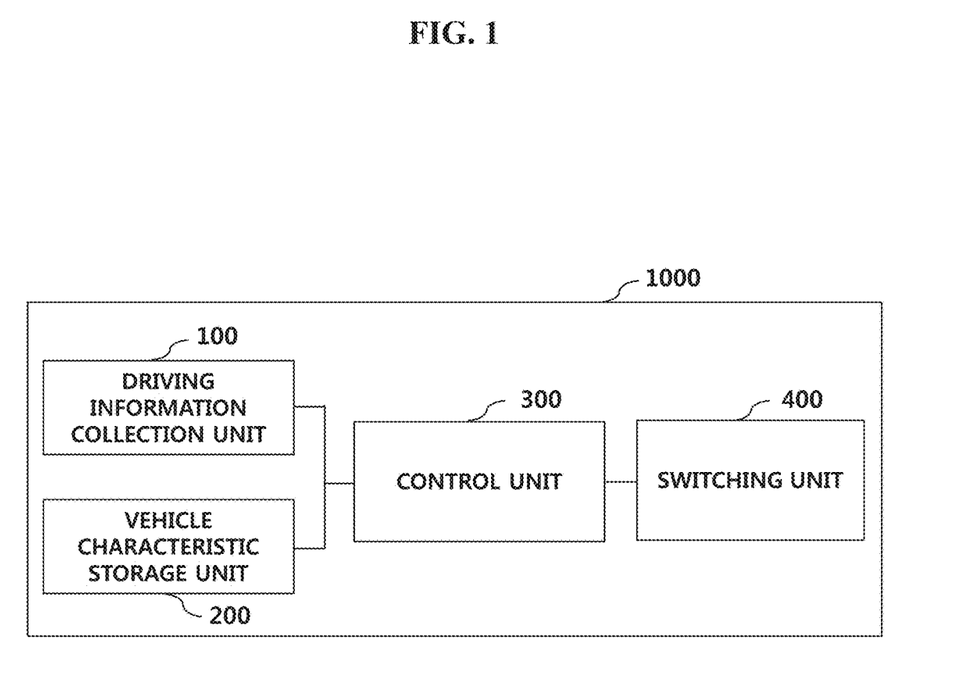
FIG. 1 is a block diagram schematically showing a configuration of a device for preventing sudden unintended acceleration according to an aspect of the present invention.

FIG. 1 is a block diagram schematically showing a configuration of a device for preventing sudden unintended acceleration according to an aspect of the present invention.

First, referring to FIG. 1, a device 1000 for preventing sudden unintended acceleration may include a driving information collector 100 configured to collect information, including a vehicle brake signal, a vehicle speed, an engine revolution per minute (rpm), a turbine rpm, and an accelerator pedal position and regarding at least one of an instant fuel consumption amount, an intake air flow rate, a coolant temperature, an engine oil temperature, a transmission oil temperature, a road slope, or an atmospheric pressure. Device 1000 may also include a vehicle characteristic storage 200 configured to store data, including a vehicle weight and a characteristic curve of a torque converter and regarding at least one of a torque ratio curve of the torque converter, a vehicle driving resistance, gear ratio, a tire dynamic radius, a frictional force for each gear stage, engine moving system inertia, or powertrain moving system inertia.

In addition, the device 1000 may include a controller 300 configured to estimate a fuel consumption amount for each component of a vehicle on the basis of the information and the data, and determine whether the vehicle is in a sudden unintended acceleration state on the basis of at least one of the estimated fuel consumption amount for each component, including fuel consumption amounts for transmission slip work loss and accelerating resistance work loss, the information, or the data. Device 1000 may also include a switch 400 configured to block input power of an electronic throttle motor of the vehicle, or limit engine power through control of the engine controller of the vehicle, or forcibly change mode D or R into mode P or N through control of the transmission controller of the vehicle or warn of the sudden unintended acceleration state and inform of measures thereof audibly or through a display on the basis of the determination of the sudden unintended acceleration state by the controller 300.

Figure 2:
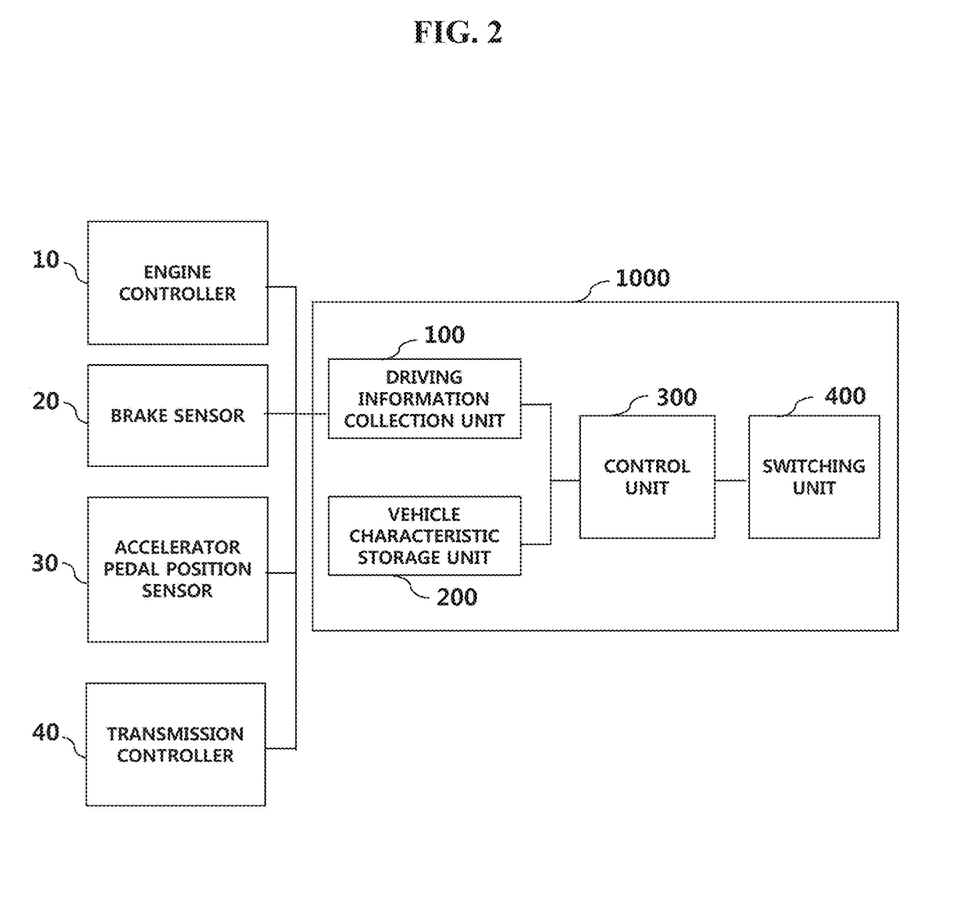
FIG. 2 is a block diagram schematically showing an entire configuration of a device for preventing sudden unintended acceleration according to an aspect of the present invention.

FIG. 2 is a block diagram schematically showing an entire configuration of a device for preventing sudden unintended acceleration according to an aspect of the present invention.

Referring to FIG. 2, the driving information collector 100 may collect information through wired or wireless communication with a vehicle and receive information from an engine controller 10, a brake sensor 20, an accelerator pedal position sensor 30, or a transmission controller 40 of the vehicle.

Here, the wired communication may be performed through an On-Board Diagnostics (OBD) port or Controller Area Network (CAN) communication, and the wireless communication may be performed through the Bluetooth. Aspects of the present invention are not limited thereto.

The device 1000 for preventing sudden unintended acceleration according to an aspect of the present invention may be implemented in the engine controller 10 depending on selection of an automotive manufacturing company.

The vehicle brake signal may be provided from the brake sensor 20 of the vehicle to the driving information collector 100. The information regarding the accelerator pedal position may be provided from the accelerator pedal position sensor 30 of the vehicle to the driving information collector 100.

Since a fuel consumption amount calculated by a trip computer upon sudden unintended acceleration may be false information, the device 1000 for preventing sudden unintended acceleration according to an aspect of the present invention may calculate the amount of fuel consumed by each component to which power is delivered powertrain through a vehicle speed, an engine rpm, a turbine rpm, an intake air flow rate, a coolant temperature, an engine oil temperature, a transmission oil temperature, an atmosphere temperature, a road slope, and PRND (i.e., park, reverse, neutral, drive) transmission state information in order to calculate the fuel consumption amount of the vehicle.

Here, the road slope may be autonomously learned and updated by the transmission controller 40 or measured through a Global Positioning System (GPS) sensor or any other sensor. The instant fuel consumption may be provided from the trip computer or OBD port.

The vehicle characteristic storage 200 may store information about an instant fuel consumption amount at the time when the vehicle is parked or decelerated while the vehicle is in a normal state in a table having axes of a vehicle speed and a coolant temperature and may continuously update the information. This is called "learning." Also, the learning table may be divided into two tables depending on whether an air-conditioner is on/off. These values are continuously compared with the sum of the calculated fuel consumption amounts that are consumed by the engine and the vehicle while the vehicle is decelerated or parked, and thus are references for determining whether sudden unintended acceleration has occurred. Idle fuel consumption amount learning is prevented before and after deceleration fuel cut and also prevented when the sudden unintended acceleration is determined to have occurred.

Figure 3:
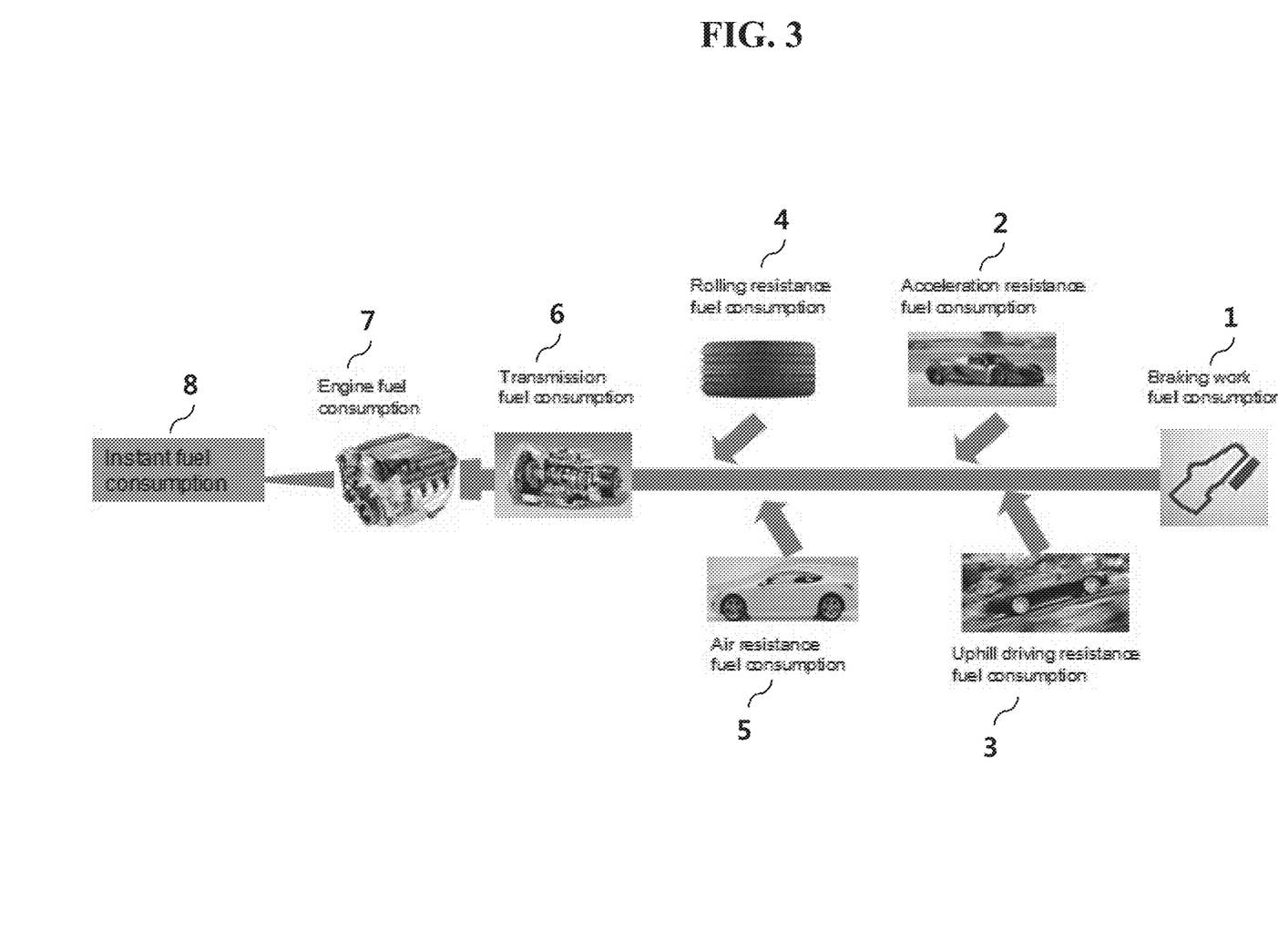
FIG. 3 shows an example showing an operation flow for determining whether sudden unintended acceleration has occurred on the basis of fuel consumption of a vehicle according to an aspect of the present invention.

FIG. 3 shows an example showing an operation flow for determining whether sudden unintended acceleration has occurred on the basis of fuel consumption of a vehicle according to an aspect of the present invention.

Referring to FIG. 3, the controller 300 may determine whether sudden unintended acceleration has occurred on the basis of vehicle driving information and each of fuel consumption amounts of components of the vehicle or the sum of the fuel consumption amounts. The equation used to find the fuel consumption amounts of components of the vehicle is as follows:

$$\text{total fuel consumption amount} * \text{fuel low heating value} = \text{incomplete combustion energy loss} + \text{engine cooling energy loss} + \text{engine exhaust energy loss} + \text{engine pumping work loss} + \text{engine friction work loss} + \text{engine accessories work loss} + \text{engine inertia work loss} + \text{transmission slip work loss} + \text{transmission gear friction work loss} + \text{rotational inertia work loss of powertrain} + \text{vehicle accelerating resistance work loss} + \text{vehicle slope travel work loss} + \text{vehicle rolling resistance work loss} + \text{vehicle aerodynamic resistance work loss} + \text{braking work loss}.$$

Equation [1]

In addition, the work loss may be found by force*movement distance or torque*rotation angle, and the energy loss may be found by multiplying friction force (torque) of each component, which is input as data or calculated experimentally, by a travel distance (rotational angle).

The vehicle slope travel work loss may be found by a vehicle weight*gravitational acceleration*sin (road slope)*a vehicle movement distance. The vehicle air resistance work loss may be found by multiplying f2*vehicle speed*vehicle speed of a travel resistance curve equation (f0+f2*vehicle speed*vehicle speed) acquired experimentally by the vehicle movement distance. The terms f0 and f2 are coefficients related to the rolling resistance and the air resistance, respectively, and are reported by the car maker to the US government by vehicle type.

The vehicle rolling resistance work loss may be found by multiplying f0 of the above equation by the vehicle movement distance.

The aerodynamic resistance decreases as an air density is reduced with altitude. The aerodynamic resistance work loss may be compensated by altitude correction. The aerodynamic resistance force may be found using another method and may be calculated by multiplying a frontal projected area and an aerodynamic resistance coefficient together, as follows:

$$\text{air resistance force} = 0.5 * \text{air density} * \text{vehicle speed} * \text{vehicle speed} * \text{aerodynamic resistance coefficient} * \text{frontal projected area}.$$

Equation [2]

The transmission slip work loss may be found by subtracting work output from a torque converter of a transmission from work input to the torque converter. The work input to the torque converter may be found by multiplying a value read from a transmission characteristic curve (C-factor curve)*the engine rpm*the engine rpm by the angle by which an input axis is rotated. The work output from the torque converter may be found by performing the torque input to the torque converter*torque ratio*the angle by which output axis is rotated. Here, the torque ratio is an output torque/input torque and a function of speed ratio (i.e., turbine rpm/engine rpm).

The braking work loss may be calculated by multiplying braking force by a movement distance. The braking force may increase and be converged as brake line oil pressure increases in proportion to the force applied to brake pedal by a driver. Thus, the brake oil pressure may be calculated quite accurately when information is provided through OBD port or CAN communication.

The fuel consumption amount of each component may be found by dividing a work loss of each component by the fuel low heating value. A total fuel consumption amount may be found by dividing the total sum of the fuel consumption amounts of the components after the engine by average engine efficiency (0.1 to 0.3).

Figure 4:
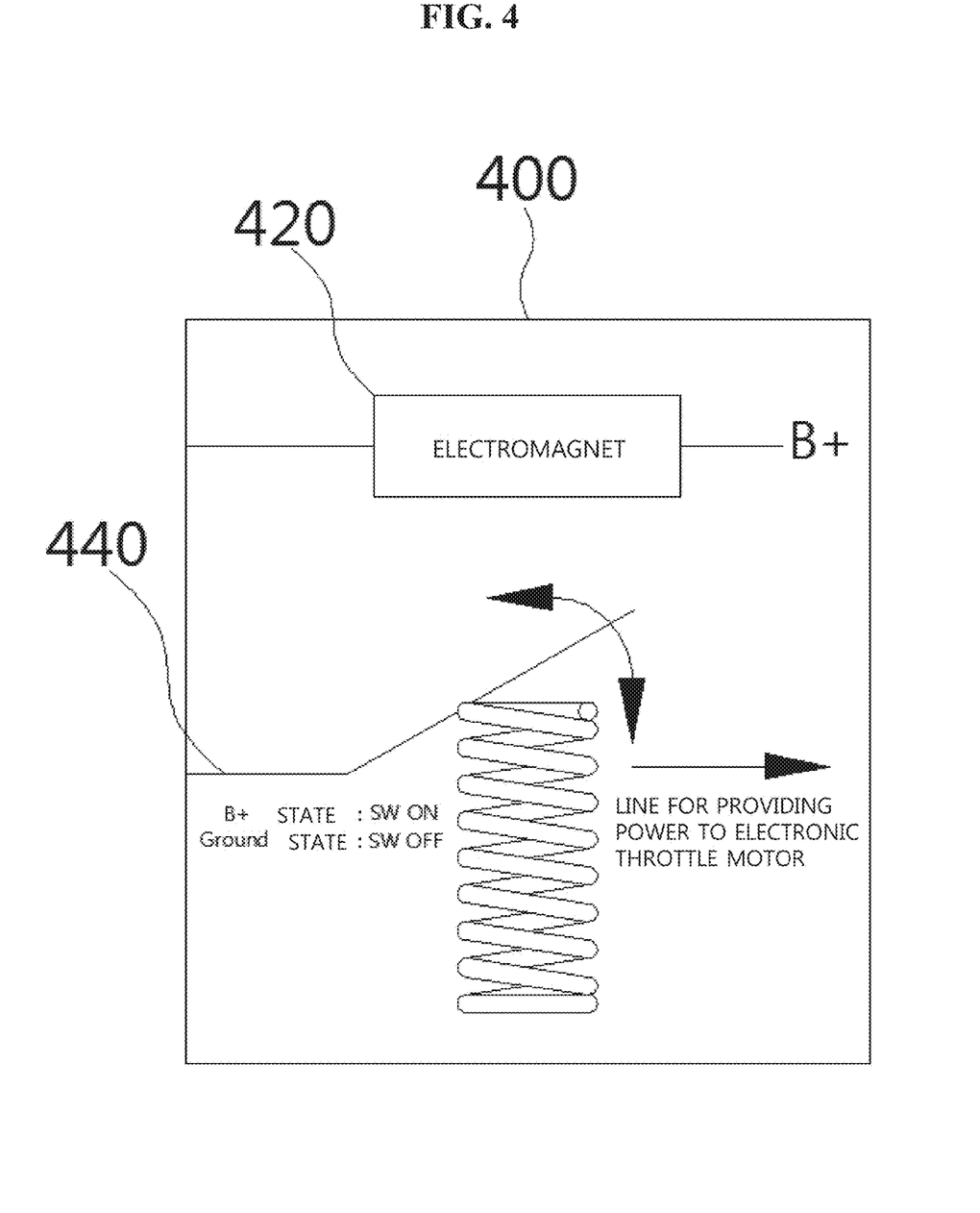
FIG. 4 is a view schematically showing a switch according to an aspect of the present invention.
Figure 5:
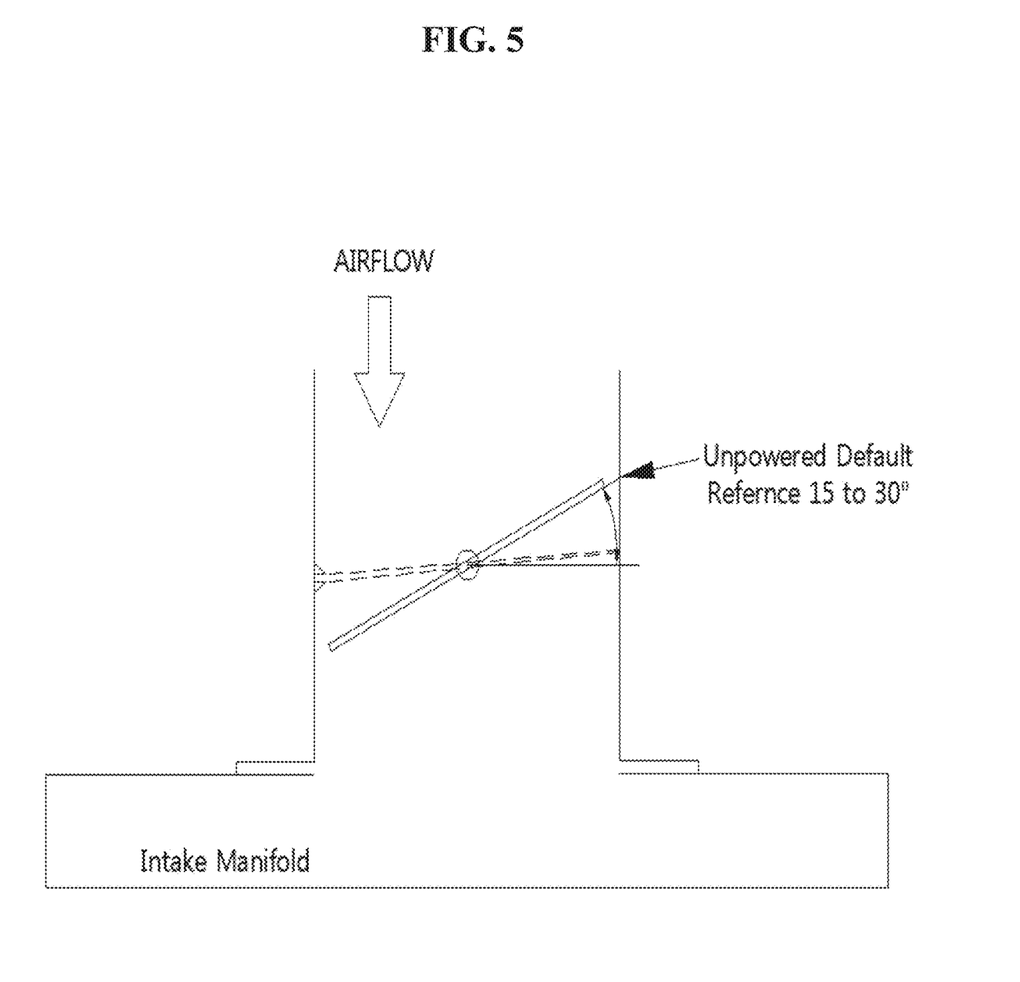
FIG. 5 is a view showing a throttle position changed by input power of an electronic throttle motor according an aspect of the present invention.

FIG. 4 is a view schematically showing a switch 400 according to an aspect of the present invention, and FIG. 5 is a view showing a throttle position changed by input power of an electronic throttle motor according an aspect of the present invention.

Referring to FIGS. 4 and 5, the switch 400 may block input power of the electronic throttle motor or limit engine power through the control of engine controller or block the power delivered to transmission by forcibly changing mode D or R into mode P or N through the control of the transmission controller or warn of the sudden unintended acceleration state and inform of measures thereof audibly (e.g., voice) or through a display.

In addition, the switch 400 may block the input power of the electronic throttle motor by driving an electromagnet 420 with low voltage when the controller 300 determines that sudden unintended acceleration has occurred.

In other words, in the switch 400, when the controller 300 determines sudden unintended acceleration, lowering the voltage of one port of the electromagnet 420 from B+ to Ground is executed and switch 400 may be opened to block the input power of the electronic throttle motor. When the input power of the electronic throttle motor is blocked, throttle position is positioned at an unpowered position by the balance of internal springs forces.

In addition, the switch 400 may perform control differently depending on a type of the switch 40. In a normal state, the controller 300 may drive the electromagnet 420 to allow power to be input while a control port is maintained as ground. In a sudden unintended acceleration, when the controller 300 increases a voltage from ground to B+, the electromagnet 420 may be not driven, and the switch 440 may be turned off to block the input power.

A device 1000 for preventing sudden unintended acceleration may further include an emergency button configured to block the input power of the electronic throttle motor upon an emergency or to limit engine power through the control of engine controller or to block power delivery to the transmission by forcibly changing the transmission into N or P mode through the control of transmission controller.

Figure 6:
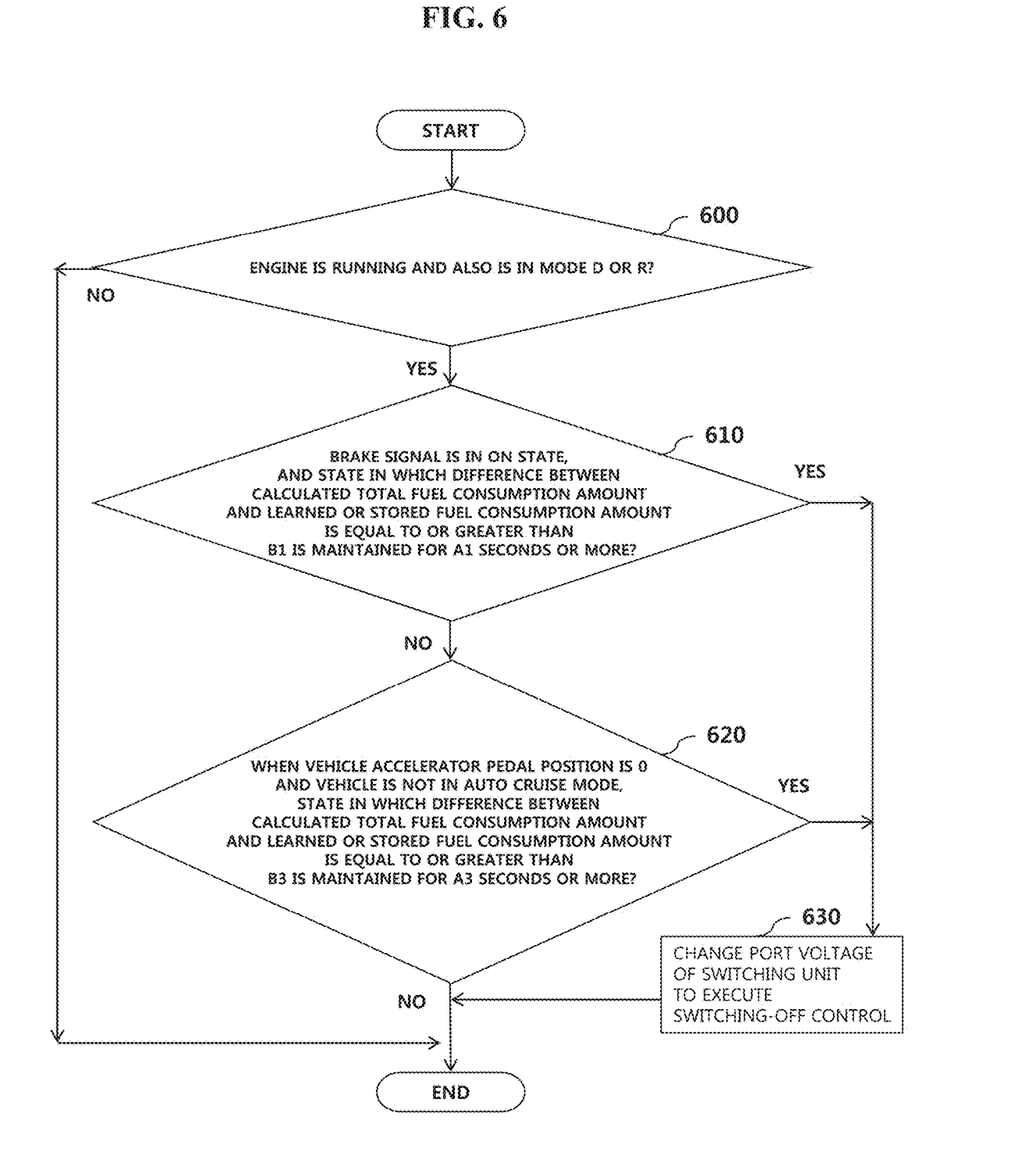
FIG. 6 is a flowchart for determining sudden unintended acceleration of a vehicle according to an aspect of the present invention.

FIG. 6 is a flowchart for determining sudden unintended acceleration of a vehicle according to an aspect of the present invention.

Referring to FIG. 6, the determination of sudden unintended acceleration may performed by the controller 300 in the following order.

At 600, it is determined that the engine is running and then is in mode D or R.

At 610, when brake signal is in ON state, it is determined whether the state in which the difference between the calculated total fuel consumption amount and the learned or stored fuel consumption amount is equal to or greater than b1 (previously set value) is maintained for a1 seconds or more.

At 620, when the vehicle accelerator pedal position is 0 and the vehicle is not in auto cruise mode, it is determined whether the state in which the difference between the calculated total fuel consumption amount and the learned or stored fuel consumption amount is equal to or greater than b3 (previously set value) is maintained for a3 seconds or more.

Here, determinations 610 and 620 are performed under the assumption that computation of a trip computer could be false.

At 630, the change port voltage of the switch 400 to execute switching-off the control is determined.

Furthermore, in the above determinations, a1 and a3 may be values in the range of 0.1 to 2 seconds in order to screen misdetection or determination error due to noise.

As described above, according to the one or more of the example aspects, the device for preventing sudden unintended acceleration can prevent sudden unintended acceleration of the vehicle by blocking the input power of the electronic throttle motor according to characteristic information and driving information of the vehicle, thus significantly enhancing vehicle driving safety.

The apparatuses, units, modules, devices, and other components illustrated in FIGS. 1-6, for example, that may perform operations described herein with respect to FIGS. 1-6, for example, are implemented by hardware components. Examples of hardware components include controllers, sensors, memory, drivers, and any other electronic components known to one of ordinary skill in the art. In one example, the hardware components are implemented by one or more processing devices, or processors, or computers. A processing device, processor, or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processing device, processor, or computer includes, or is connected to, one or more memories storing instructions or software that are executed by the processing device, processor, or computer and that may control the processing device, processor, or computer to implement one or more methods described herein. Hardware components implemented by a processing device, processor, or computer execute instructions or software, such as an operating system (OS) and one or more software applications that run on the OS, to perform the operations described herein with respect to FIGS. 1-6, for example. The hardware components also access, manipulate, process, create, and store data in response to execution of the instructions or software. For simplicity, the singular term "processing device", "processor", or "computer" may be used in the description of the examples described herein, but in other examples multiple processing devices, processors, or computers are used, or a processing device, processor, or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, remote processing environments, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described herein may be performed by a processing device, processor, or a computer as described above executing instructions or software to perform the operations described herein.

Instructions or software to control a processing device, processor, or computer to implement the hardware components and perform the methods as described above may be written as computer programs, code segments, instructions or any combination thereof, for individually or collectively instructing or configuring the processing device, processor, or computer to operate as a machine or special-purpose computer to perform the operations performed by the hardware components and the methods as described above. In one example, the instructions or software include machine code that is directly executed by the processing device, processor, or computer, such as machine code produced by a compiler. In another example, the instructions or software include higher-level code that is executed by the processing device, processor, or computer using an interpreter. Based on the disclosure herein, and after an understanding of the same, programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processing device, processor, or computer to implement the hardware components, such as discussed in any of FIGS. 1-6, and perform the methods as described above in any of FIGS. 1-6, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DV-Rs, DVD+Rs, DVD-RWs, DVD+RWs, DVD-RAMS, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processing device, processor, or computer so that the processing device, processor, or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processing device, processor, or computer.

What is claimed is:

1. A device for preventing sudden unintended acceleration, the device comprising:
    a driving information collector configured to collect information, including a vehicle brake signal, a vehicle speed, an engine revolution per minute (rpm), a turbine rpm, and an accelerator pedal position;
    a vehicle characteristic storage configured to store data, including a vehicle's weight, and a characteristic curve of a torque converter;
    a brake sensor connected with the driving information collector and configured to sense the vehicle brake signal;
    an accelerator pedal position sensor connected with the driving information collector and configured to sense the accelerator pedal position; and
    a controller configured to calculate the difference between a total fuel consumption amount and a learned or stored fuel consumption amount based on the information and data,
    wherein the total fuel consumption amount includes at least one of a fuel consumption amount or a transmission slip work loss and a fuel consumption amount for an accelerating resistance work loss,
    wherein the controller is configured to determine whether a vehicle is in a sudden unintended acceleration state based on:
    (1) the difference between a total fuel consumption amount and a learned or stored fuel consumption amount;
    (2) whether a brake signal is ON; and
    (3) whether an accelerator pedal position is in an initial position and the vehicle is not in an auto cruise mode, and
    wherein the controller initiates an action when the vehicle is determined to be in the sudden unintended acceleration state.

2. The device of claim 1,
    wherein said action comprises actuating a switch configured to block an input power of an electronic throttle motor of the vehicle based on a determination by the controller that the vehicle is in the sudden unintended acceleration state.

3. The device of claim 1,
    wherein said action comprises actuating a switch configured to limit an engine power through control of an engine controller of the vehicle based on a determination by the controller that the vehicle is in the sudden unintended acceleration state.

4. The device of claim 1,
    wherein said action comprises actuating a switch configured to warn of the sudden unintended acceleration state based on a determination by the controller that the vehicle is in the sudden unintended acceleration state.

5. The device of claim 1,
    wherein said action comprises actuating a switch configured to inform of measures thereof audibly or through a display based on a determination by the controller that the vehicle is in the sudden unintended acceleration state.

6. A device for preventing sudden unintended acceleration, the device comprising:
    a driving information collector configured to collect information, including a vehicle brake signal, a vehicle speed, an engine revolution per minute, a turbine rpm, and an accelerator pedal position;
    a vehicle characteristic storage configured to store data, including a vehicle's weight, a transmission characteristic curve (C-factor curve), a torque ratio curve of the torque converter;
    a brake sensor connected with the driving information collector and configured to sense the vehicle brake signal;
    an accelerator pedal position sensor connected with the driving information collector and configured to sense the accelerator pedal position; and
    a controller configured to determine whether a vehicle is in a sudden unintended acceleration state based on:
    (1) the calculation of difference between a total fuel consumption amount and a learned or stored fuel consumption amount based on the information and data;
    (2) whether the brake signal is ON; and (3) whether an accelerator pedal position is initial position and the vehicle is not in the auto cruise mode, wherein the total fuel consumption amount includes at least one of the fuel consumption amounts for a transmission slip work loss and an accelerating resistance work loss, and wherein the controller initiates an action when the vehicle is determined to be in the sudden unintended acceleration state.

7. The device of claim 6, wherein said action comprises actuating a switch configured to block an input power of an electronic throttle motor of the vehicle based on a determination by the controller that the vehicle is in the sudden unintended acceleration state.

8. The device of claim 6, wherein said action comprises actuating a switch configured to limit an engine power through control of an engine controller of the vehicle based on a determination by the controller that the vehicle is in the sudden unintended acceleration state.

9. The device of claim 6, wherein said action comprises actuating a switch configured to warn of the sudden unintended acceleration state based on a determination by the controller that the vehicle is in the sudden unintended acceleration state.

10. The device of claim 6, wherein said action comprises actuating a switch configured to inform of measures thereof audibly or through a display based on a determination by the controller that the vehicle is in the sudden unintended acceleration state.

11. A device for preventing sudden unintended acceleration, the device comprising:

a driving information collector configured to collect information, including a vehicle brake signal, a vehicle speed, an engine revolution per minute, a turbine rpm, and an accelerator pedal position;

a vehicle characteristic storage configured to store data, including a vehicle's weight, a transmission characteristic curve (C-factor curve), a torque ratio curve of the torque converter;

a brake sensor connected with the driving information collector and configured to sense the vehicle brake signal;

an accelerator pedal position sensor connected with the driving information collector and configured to sense the accelerator pedal position; and a controller configured to determine whether a vehicle is in a sudden unintended acceleration state based on:

(1) the calculation of a difference between a total fuel consumption amount and a learned or stored fuel consumption amount based on the information and the data; and the determination of whether the brake signal is ON, or (2) the calculation of a difference between the total fuel consumption amount and the learned or stored fuel consumption amount based on the information and the data; and whether the accelerator pedal position is initial position and the vehicle is not in the auto cruise mode, wherein the total fuel consumption amount includes at least one of the fuel consumption amounts for a transmission slip work loss and an accelerating resistance work loss, and wherein the controller initiates an action when the vehicle is determined to be in the sudden unintended acceleration state.

12. The device of claim 11, wherein said action comprises actuating a switch configured to block an input power of an electronic throttle motor of the vehicle based on a determination by the controller that the vehicle is in the sudden unintended acceleration state.

13. The device of claim 11, wherein said action comprises actuating a switch configured to limit an engine power through control of an engine controller of the vehicle based on a determination by the controller that the vehicle is in the sudden unintended acceleration state.

14. The device of claim 11, wherein said action comprises actuating a switch configured to warn of the sudden unintended acceleration state based on a determination by the controller that the vehicle is in the sudden unintended acceleration state.

15. The device of claim 11, wherein said action comprises actuating a switch configured to inform of measures thereof audibly or through a display based on a determination by the controller that the vehicle is in the sudden unintended acceleration state.

* * * * *